United States Patent Office.

GUSTAV L. JAEGER, OF NEW YORK, N. Y.

Letters Patent No. 105,084, dated July 5, 1870.

IMPROVEMENT IN ADHESIVE COMPOUND FOR PREPARING PASTEBOARD.

The Schedule referred to in these Letters Patent and making part of the same

*To all whom it may concern:*

Be it known that I, GUSTAV L. JAEGER, of the city, county, and State of New York, have invented a new and improved Adhesive Compound; and I do hereby declare the following to be a full, clear, and exact description thereof, which will enable those skilled in the art to make and use the same.

This invention relates to a compound made of paste or other adhesive material and plaster of Paris or other coloring matter, which, when mixed with the adhesive substance, acts as a drier, and also as an intervening layer, preventing the yellow or brown color of pasteboard from showing through paper pasted thereon, in such a manner that very thin paper can be employed for lining pasteboards, and much expense is thereby saved.

In carrying out my invention I take common paste and mix with it a quantity of plaster of Paris, finely pulverized.

The proportion in which these ingredients are mixed varies according to the work to be accomplished.

For ordinary work I use, paste, two parts, plaster of Paris, one part. This compound I use particularly for lining pasteboards.

When ordinary paste is used for this purpose, the yellow or gray color of the pasteboard is liable to show through the paper, and, in order to produce good work, paper of a certain thickness must be used, and thereby the cost of lining pasteboards is materially increased.

With my adhesive compound I am enabled to use very thin paper, the plaster of Paris forming a layer between the pasteboard and the paper, whereby the color of the pasteboard is prevented from showing through the paper; and, furthermore, the plaster of Paris acts as a drier, whereby the operation of drying the lined pasteboards is materially facilitated.

It is obvious that the other adhesive materials, such as glue, could be substituted for paste in my compound, and, instead of plaster of Paris, any suitable white powder may be used, though I use, by preference, the ingredients above specified.

What I claim as new, and desire to secure by Letters Patent, is—

An adhesive compound, made substantially in the manner herein described.

This specification signed by me this 12th day of June, 1870.

GUSTAV L. JAEGER.

Witnesses:
W. HAUFF,
E. F. KASTENHUBER.